July 8, 1924.

G. W. DOVER 1,500,302

RAIN PROTECTOR FOR VEHICLES

Filed Oct. 10, 1921

INVENTOR.
GEORGE W. DOVER
BY Perley H. Plant
ATTORNEY

July 8, 1924.
G. W. DOVER
RAIN PROTECTOR FOR VEHICLES
Filed Oct. 10, 1921
1,500,302
2 Sheets-Sheet 2
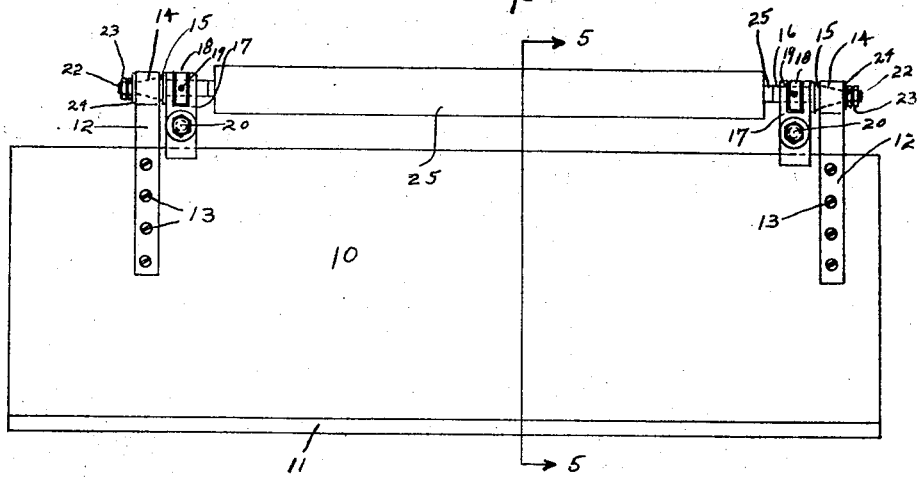
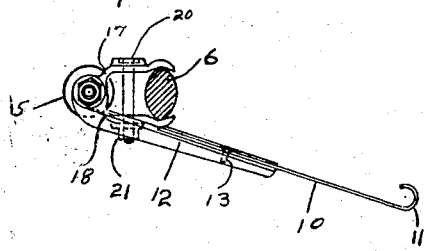
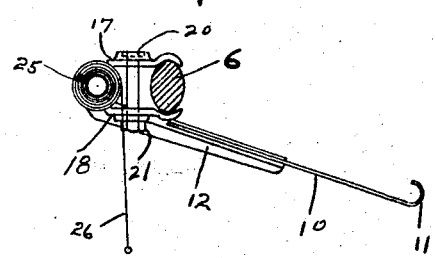
INVENTOR.
GEORGE W. DOVER
BY Perley H. Plant,
ATTORNEY.

Patented July 8, 1924.

1,500,302

UNITED STATES PATENT OFFICE.

GEORGE W. DOVER, OF CRANSTON, RHODE ISLAND, ASSIGNOR OF ONE-HALF TO JOHN MONTGOMERY, WOONSOCKET, RHODE ISLAND.

RAIN PROTECTOR FOR VEHICLES.

Application filed October 10, 1921. Serial No. 506,723.

*To all whom it may concern:*

Be it known that I, GEORGE W. DOVER, a citizen of the United States, residing at Cranston, in the county of Providence and State of Rhode Island, have invented certain new and useful Improvements in Rain Protectors for Vehicles, of which the following is a specification.

This invention relates to a rain protector for vehicles, particularly adapted for use in connection with automobiles and other vehicles provided with a top portion, for excluding rain and sleet from the interior of the vehicle body while enabling the driver and the occupants of the vehicle to maintain a fairly unobstructed view from the sides of the vehicle.

One object of the invention is to provide a device of this character capable of being quickly and easily placed in position to exclude rain from the interior of the vehicle and readily moved to retracted position where it is inconspicuous and out of the way of the occupants of the vehicle.

Another object of the invention is to provide a device of the character described consisting of a shield for deflecting rain from the interior of the vehicle and a curtain adapted to serve as a closure for a portion of the vehicle body, the parts being so constructed and arranged as to be capable of use either separately or together for the purpose of excluding rain from the interior of the vehicle.

Another object of the invention is to provide a novel mounting for the shield member whereby it will be positively held in either its outwardly extended position or its inwardly retracted position relative to the vehicle top, while at the same time being capable of being readily moved into or from either of said positions as desired.

Other objects and advantages of the invention relate to certain novel details of construction and methods of operation as will be more fully set forth in the detailed description to follow.

Referring to the drawings:

Fig. 3 is a side elevational view showing the position of the shield and curtain in assembled relation, and the means whereby the same are supported from the vehicle top.

Fig. 4 is an end view of the structure shown in Fig. 3, and

Fig. 5 is a sectional view taken along the line 5—5 of Fig. 3.

Figure 1:
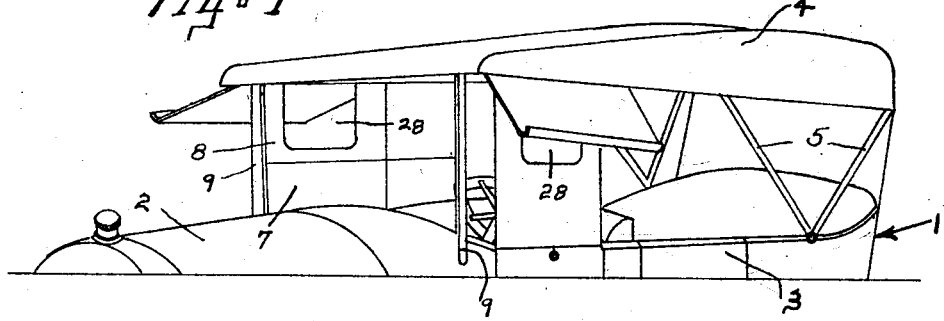
Fig. 1 is a perspective view of an automobile showing my improved rain protector as applied thereto adjacent the driver's seat.

In the embodiment of the invention illustrated herewith 1 designates an automobile of the conventional type provided with a hood 2, and a body portion 3 having a top 4 supported by standards 5 and bows 6 after a manner well known in the art. Transparent front windshield sections 7 and 8 are supported by posts 9 to which the forwardly extending portion of the top may be secured after the usual or any desired manner in order to assist in holding the top securely in position.

In the accompanying drawings I have shown my improved rain protectors as applied to the front bow 6 upon each side of the driver's seat, where they may be quickly moved into position to exclude rain from the driver's seat while permitting a fairly unobstructed view of the road. It will be readily understood that while the structure has been shown in the present instance, in connection with the usual touring car top, it may be advantageously employed as a protector for the driver's seat in limousines, taxicabs, and the like, and may where the construction of the supporting standards permit, be secured to the rear bow of the vehicle in the same manner as it is shown in the present instance as applied to the front bow.

Figure 2:
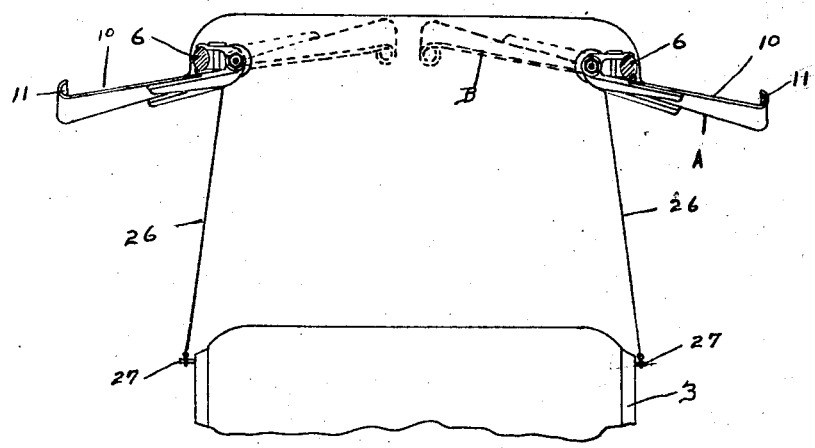
Fig. 2 is a transverse sectional view taken through the top of the vehicle shown in Fig. 1, and illustrating the manner of supporting the rain protector from the top.

Each rain protector unit comprises a shield 10, the surface of which is preferably inclined from front to rear as best shown in Fig. 2 of the drawings, and provided with a curved lower edge to form a trough 11 for the water falling upon the outer surface thereof. The shield member is secured to brackets 12 by suitable securing means 13, each of the said brackets being provided with a tapered bearing 14 within which fits a conical shaft 15 provided with an extension 16 upon which is mounted a pair of clamping jaws 17 and 18, one of said jaws being secured to said extension by a pin 19. A bolt 20 is passed thru the clamping jaws 17 and 18 a short distance from the extension 16 and a nut 21 threaded thereon serves to hold the jaws in clamping engagement with the bow 6 of the vehicle top. After the brackets 12 are positioned upon the conical shafts 15, spring washers 24 are placed over the threaded ends 22 of the shafts and nuts 23, are threaded thereon a sufficient distance to draw the tapered bearings into frictional engagement with the conical shafts to a sufficient extent to hold the parts against accidental movement relative to each other while permitting the bearings to be rotated upon the conical shafts in changing the angular position of the shield member. A spring actuated roller 25 is mounted in any suitable manner between the inner ends of the extensions 16, and a curtain 26 is carried by the roller so as to be capable of being drawn downwardly and serve as a closure for a portion of the body of the vehicle while at the same time being capable of being wound upon the roller when desired.

One or more securing devices 27 mounted upon the body portion of the vehicle serve as attaching means for holding the curtain in lowered position. The curtain is preferably provided with an opening 28 whereby the driver or the occupants of the seat are enabled to observe the road and conditions of traffic at the side of the vehicle when the curtain is in lowered position, the opening in the curtain being so positioned as to be protected against the entry of rain by the shield member.

As shown in Figs. 1 and 2 of the drawings, the structure is so formed and supported from the vehicle top as to permit the shield member to be rotated upon the conical bearings 15 either into outwardly projected position as indicated at A or into inwardly retracted position as indicated at B.

The shield may be readily turned into either of these positions and will be positively held in each position by means of the frictional resistance between the bearings 14 and shafts 15. When in the position indicated by B in Fig. 2 of the drawings the shield is substantially concealed from view and is out of the way of the occupants of the car. The curtain may be drawn down and secured to the fastening means 27 when the shield member is in either its outwardly projected position or its inwardly retracted position, thus permitting the utilization of the curtain as a closure for a portion of the vehicle body in either position of the shield member.

From the above description it will be seen that I have provided a novel and efficient form of rain protector which may be supported by the bows or other suitable devices and carried by the vehicle top in such a manner as to be capable of being turned into outwardly extended position at any desired angle to the top and frictionally held therein, or turned into inwardly retracted position wherein the same will be frictionally held by its supporting mounting in inconspicuous position and out of the way of the occupants of the vehicle. The novel construction of the supporting mechanism for supporting the shield and curtain from the bows permits the frictional resistance to the rotation of the shield member to be varied so that the same may be adjusted to hold the shield member in any required angular position relative to the top while permitting the shield to be readily moved as desired.

While I have shown and described in considerable detail the preferred embodiment of my invention in order to make the construction and operation of the same clear to those skilled in the art, I do not intend to be limited to the precise details of construction shown and described except as the same may be properly included in the terms of the following claims when broadly construed in the light of my invention.

Having described my invention, what I claim is:

1. In a rain protector for vehicles, a vehicle top provided with a bow, clamping means detachably secured to said bow, a shield pivotally supported by said clamping means for movement into outwardly extended position or inwardly retracted position relative to said top, a curtain carrying roll rotatably supported by said detachable clamping means, and a curtain carried by said roll and movable into extended position when said shield is in either its extended or retracted positions.

2. In a rain protector for vehicles, a vehicle top provided with a bow, clamping means detachably secured to said bow, a shield pivotally supported by said clamping means for movement into outwardly extended position or inwardly retracted position relative to said top, a curtain carrying roll rotatably supported by said clamping means, and a curtain supported by said roll and adapted when in extended position to serve as a closure for a portion of the vehicle body.

3. In a rain protector for vehicles, the combination with a vehicle top, of a rearwardly inclined shield member of substantially rigid construction laterally positioned relative to said top and pivotally supported therefrom for bodily extended movement into outwardly projecting position or inwardly retracted position relative thereto.

4. In a rain protector for vehicles, the combination of a vehicle top, a shield member pivotally supported from said top and movable into outwardly projected position or inwardly retracted position relative thereto, a roll mounted substantially coaxially with said shield, and a curtain supported by said roll and adapted to be drawn into closed position when said shield is in either its outwardly projecting position or its inwardly retracted position.

5. In a rain protector for vehicles, the combination of a vehicle top, a shield member pivotally supported from said top and movable into outwardly projected position or inwardly retracted position relative thereto, a roll supported from said top substantially coaxially with said shield, and a curtain supported by said roll and having an opening formed therein, said curtain being adapted to be drawn into closed position independently of said shield when said shield is in its outwardly projecting position.

6. In a rain protector for vehicles, the combination of a vehicle top, a front bow, means carried by the front bow for pivotally supporting a shield member, whereby said shield member may be turned to different angular positions and retained against accidental movement therefrom, and a curtain supported by said shield supporting means and adapted to cooperate with said shield to prevent rain from entering the vehicle body, said curtain and said shield being each movable independently of the other.

7. In a rain protector for vehicles, the combination of a vehicle top, and a protector unit carried by said top and comprising a shield member and a curtain, the curtain being adapted to be drawn into closed position to cover the open side of the vehicle body, said shield member and curtain being each movable into and out of rain excluding position independently of each other.

In testimony whereof I have affixed my signature.

GEORGE W. DOVER.